United States Patent
Ward et al.

(10) Patent No.: US 10,422,925 B2
(45) Date of Patent: Sep. 24, 2019

(54) 2.5D STADIA MESHING

(71) Applicant: Landmark Graphics Corporation, Houston, TX (US)

(72) Inventors: Steven Bryan Ward, Austin, TX (US); Michael Loyd Brewer, Katy, TX (US)

(73) Assignee: Landmark Graphics Corporation, Houston, TX (US)

( * ) Notice: Subject to any disclaimer, the term of this patent is extended or adjusted under 35 U.S.C. 154(b) by 437 days.

(21) Appl. No.: 14/888,400

(22) PCT Filed: Jul. 2, 2013

(86) PCT No.: PCT/US2013/049155
§ 371 (c)(1),
(2) Date: Oct. 30, 2015

(87) PCT Pub. No.: WO2015/002645
PCT Pub. Date: Jan. 8, 2015

(65) Prior Publication Data
US 2016/0116635 A1    Apr. 28, 2016

(51) Int. Cl.
*G01V 99/00*    (2009.01)
(52) U.S. Cl.
CPC ........ *G01V 99/005* (2013.01); *G01V 2210/64* (2013.01); *G01V 2210/646* (2013.01); *G01V 2210/66* (2013.01)
(58) Field of Classification Search
CPC ............. G01V 99/005; G01V 2210/64; G01V 2210/646; G01V 2210/66
(Continued)

(56) References Cited

U.S. PATENT DOCUMENTS

| 2003/0216898 | A1* | 11/2003 | Basquet | E21B 49/00 |
| | | | | 703/10 |
| 2005/0273303 | A1* | 12/2005 | Flandrin | G06T 17/20 |
| | | | | 703/10 |

(Continued)

FOREIGN PATENT DOCUMENTS

KR    1020110138088 A    12/2011

OTHER PUBLICATIONS

European Patent Office, Supplementary European Search Report, dated Apr. 10, 2017, 8 pages, Europe.
(Continued)

*Primary Examiner* — Sheikh Maruf

(57) ABSTRACT

The disclosed embodiments include a method, apparatus, and computer program product for generating hybrid computational meshes around complex and discrete fractures for the purpose of reservoir simulation. For example, one embodiment is a computer-implemented method for modeling three-dimensional (3D) geological fractures. The method includes the steps of receiving a set of fractures with geometry that has been discretized in a two-dimensional plane by a collection of line segments. The method generates closed loops around all the line segments associated with a fracture using a set of stadia and further generates shape elements within the closed loops. A constrained mesh around the closed loops of the set of fracture is generated to fill in a remainder space of the two-dimensional plane. The cell elements in the two-dimensional plane can then be extruded in a third dimension to form a three-dimensional model usable for performing reservoir simulations.

20 Claims, 8 Drawing Sheets

(58) Field of Classification Search
USPC .......................................................... 703/10
See application file for complete search history.

(56) References Cited

U.S. PATENT DOCUMENTS

| | | | | |
|---|---|---|---|---|
| 2006/0015310 A1* | 1/2006 | Husen | ..................... | E21B 43/26 703/10 |
| 2006/0025976 A1* | 2/2006 | Kennon | .............. | G06F 17/5018 703/10 |
| 2007/0073527 A1* | 3/2007 | Flandrin | ................. | G06T 17/20 703/10 |
| 2008/0091396 A1* | 4/2008 | Kennon | .................. | E21B 43/26 703/10 |
| 2008/0133186 A1* | 6/2008 | Li | ....................... | G06F 17/5018 703/2 |
| 2009/0254324 A1* | 10/2009 | Morton | .................. | G01V 1/282 703/10 |
| 2010/0076738 A1 | 3/2010 | Dean et al. | | |
| 2010/0121623 A1* | 5/2010 | Yogeswaren | .......... | G01V 11/00 703/2 |
| 2010/0138202 A1* | 6/2010 | Mallison | ................. | E21B 43/00 703/10 |
| 2010/0191511 A1* | 7/2010 | Hsu | ....................... | E21B 49/006 703/1 |
| 2010/0312529 A1* | 12/2010 | Souche | ................... | E21B 43/26 703/2 |
| 2012/0173220 A1* | 7/2012 | Li | ....................... | G06F 17/5018 703/10 |
| 2012/0191432 A1* | 7/2012 | Khataniar | ............... | E21B 43/00 703/10 |
| 2012/0267104 A1 | 10/2012 | Clarson et al. | | |
| 2012/0310613 A1 | 12/2012 | Moos et al. | | |
| 2013/0073272 A1* | 3/2013 | Wallace | ................. | E21B 43/00 703/10 |
| 2013/0096889 A1* | 4/2013 | Khvoenkova | ........... | G06F 17/10 703/2 |
| 2013/0238297 A1* | 9/2013 | Lepage | .................. | G01V 99/00 703/2 |
| 2013/0246030 A1* | 9/2013 | Usadi | ..................... | E21B 43/12 703/10 |
| 2013/0321407 A1* | 12/2013 | Jenkins | .................. | G01V 1/345 345/419 |
| 2014/0222403 A1* | 8/2014 | Lepage | ................ | G01V 99/005 703/6 |
| 2014/0278298 A1* | 9/2014 | Maerten | ............... | G01V 99/005 703/2 |
| 2015/0066460 A1* | 3/2015 | Klinger | ............... | G06F 17/5018 703/2 |
| 2015/0066462 A1* | 3/2015 | Shetty | ..................... | E21B 41/00 703/10 |
| 2015/0094999 A1* | 4/2015 | VanderHeyden | ....... | E21B 41/00 703/2 |
| 2015/0205006 A1* | 7/2015 | Maerten | ............... | G01V 99/005 703/2 |
| 2016/0124116 A1* | 5/2016 | Souche | ................ | G01V 99/005 703/2 |
| 2016/0124117 A1* | 5/2016 | Huang | .................... | G06T 17/05 703/2 |
| 2016/0131800 A1* | 5/2016 | Pecher | .................... | E21B 49/00 703/10 |
| 2016/0168959 A1* | 6/2016 | Yarus | ..................... | G06T 19/00 703/2 |
| 2016/0187533 A1* | 6/2016 | Maucec | ............... | G01V 99/005 703/10 |
| 2017/0299770 A1* | 10/2017 | Brewer | ................ | G01V 99/005 |
| 2018/0232950 A1* | 8/2018 | Brewer | ................ | G06T 17/205 |
| 2018/0347320 A1* | 12/2018 | Renaudeau | .......... | G01V 99/005 |

OTHER PUBLICATIONS

International Search Report, dated Mar. 18, 2014, 10 pages; Korean International Searching Authority.

\* cited by examiner

2.5D STADIA MESHING

CROSS-REFERENCE TO RELATED APPLICATIONS

This application is a U.S. national stage patent application of International Patent Application No. PCT/US2013/049155, filed on Jul. 2, 2013, the benefit of which is claimed and the disclosure of which is incorporated herein by reference in its entirety.

BACKGROUND OF THE INVENTION

1. Field of the Invention

The present invention generally relates to a system and method for generating a grid that can be used to construct a simulation model of a subsurface reservoir, and more particularly, to a system and method configured for modeling geological fractures.

2. Discussion of the Related Art

In the oil and gas industry, reservoir modeling involves the construction of a computer model of a petroleum reservoir for the purposes of improving estimation of reserves and making decisions regarding the development of the field. For example, geological models may be created to provide a static description of the reservoir prior to production. In contrast, reservoir simulation models may be created to simulate the flow of fluids within the reservoir over its production lifetime.

One challenge with reservoir simulation models is the modeling of fractures within a reservoir, which requires a thorough understanding of matrix flow characteristics, fracture network connectivity and fracture-matrix interaction. Fractures can be described as open cracks or voids within the formation and can either be naturally occurring or artificially generated from a wellbore. The correct modeling of the fractures is important as the properties of fractures such as spatial distribution, aperture, length, height, conductivity, and connectivity significantly affect the flow of reservoir fluids to the well bore.

Accordingly, the disclosed embodiments provide a system, method, and computer program product for generating hybrid computational meshes around complex and discrete fractures for the purpose of reservoir simulation.

BRIEF DESCRIPTION OF THE DRAWINGS

Illustrative embodiments of the present invention are described in detail below with reference to the attached drawing figures, which are incorporated by reference herein and wherein.

DETAILED DESCRIPTION

The disclosed embodiments include a system and method for modeling three-dimensional (3D) objects, such as, but not limited to, geological fractures. The disclosed embodiments and advantages thereof are best understood by referring to FIGS. 1-8 of the drawings, like numerals being used for like and corresponding parts of the various drawings. Other features and advantages of the disclosed embodiments will be or will become apparent to one of ordinary skill in the art upon examination of the following figures and detailed description. It is intended that all such additional features and advantages be included within the scope of the disclosed embodiments. Further, the illustrated figures are only exemplary and are not intended to assert or imply any limitation with regard to the environment, architecture, design, or process in which different embodiments may be implemented.

Figure 1:
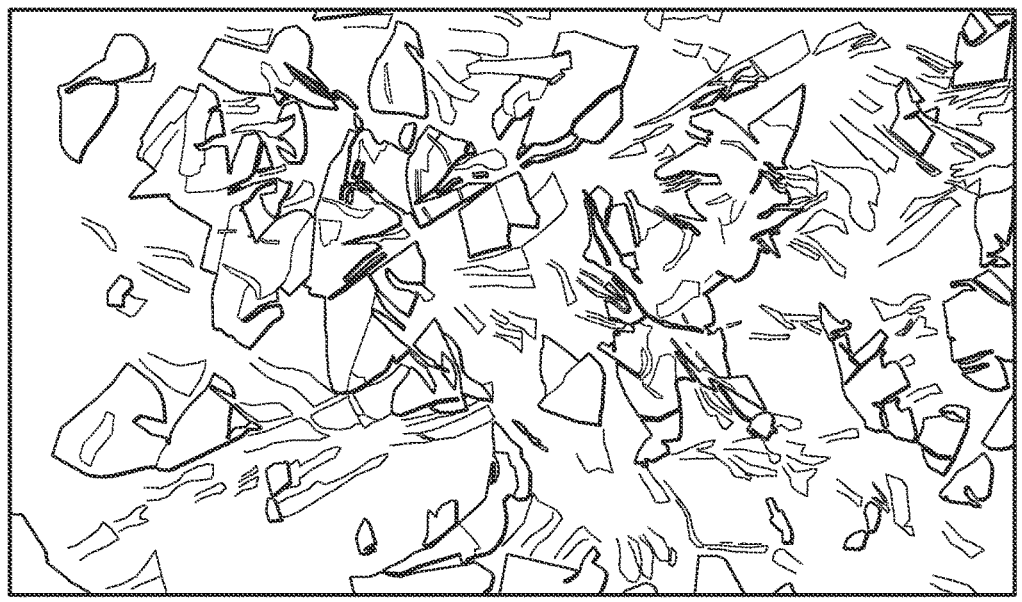
FIG. 1 illustrates an image of three-dimensional fractures that are modeled in accordance with the disclosed embodiments.

FIG. 1 illustrates an image of three-dimensional fractures that are modeled in accordance with the disclosed embodiments. As can be seen in image 100, the layers of earth formation includes fractures within the formation. As stated above, these fractures can be described as open cracks or voids within the formation and can either be naturally occurring or artificially generated from a wellbore. Understanding and modeling the proper characteristic of these fractures is important as the fractures enables and affect the flow reservoir fluids to the well bore. Images such as image 100 may be obtained or generated using image logs. Image logs use a rotating transducer to measure acoustic impedance across the entire borehole wall to identify the presence and direction of rock fractures, as well as understanding the dip direction of the stratigraphy.

Figure 2A:
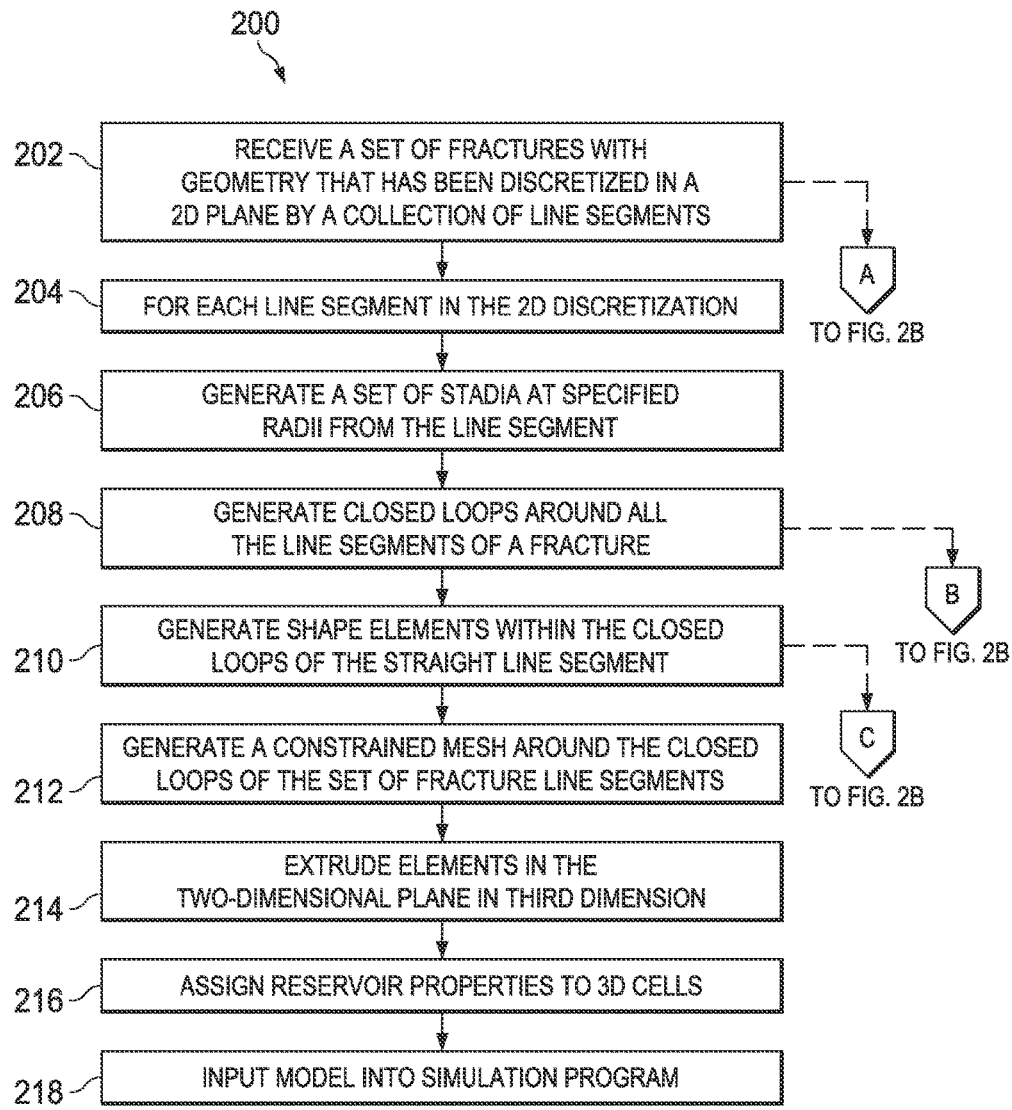
FIG. 2 is a flow diagram illustrating a method for modeling three-dimensional fractures in accordance with a disclosed embodiment.
Figure 2B:
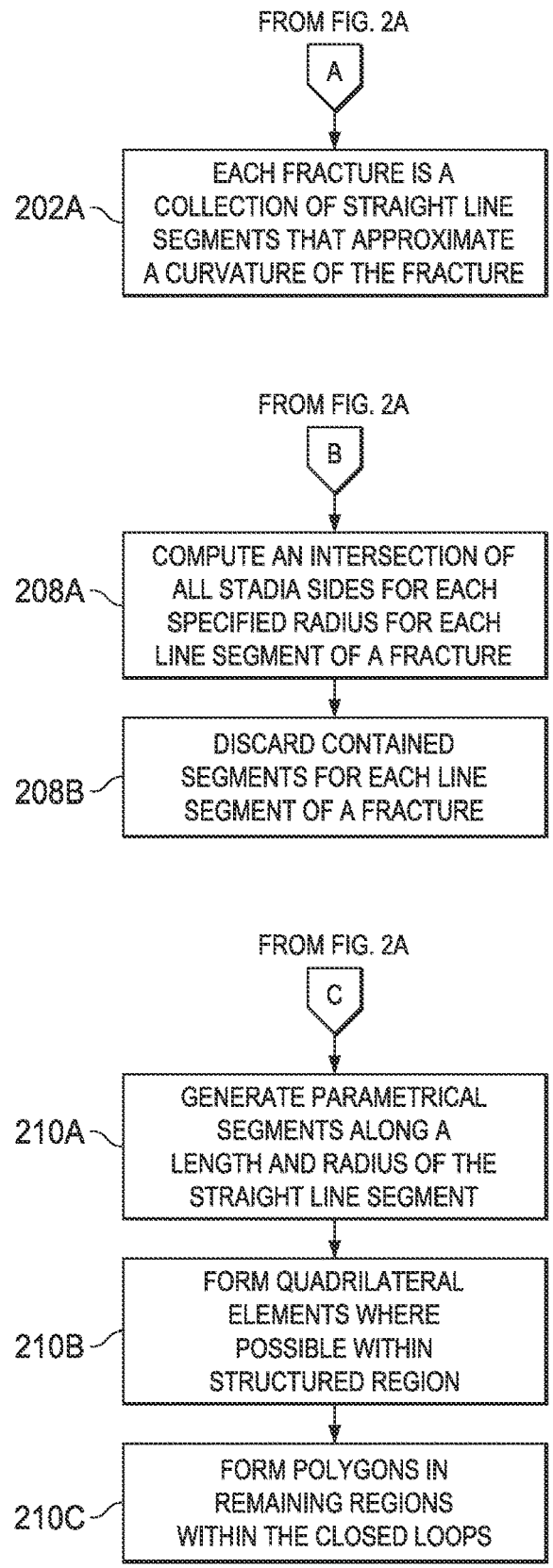

FIG. 2 is a flow diagram illustrating a method/process 200 for modeling three-dimensional fractures in accordance with a disclosed embodiment. In the depicted embodiment, the method begins by receiving a set of fractures with geometry that has been discretized in a two-dimensional plane by a collection of line segments (step 202). In an alternative embodiment, the process 200 may begin by performing the discretization of a set of fractures in a two-dimensional plane by a collection of line segments. As will be further described, the collection of line segments represents the intersection between the two-dimensional plane and the three-dimensional geological fractures. Each fracture is be represented by a collection of straight line segments to approximate a curvature of the fracture.

In accordance with the disclosed embodiment, for each fracture line segment in the two-dimensional plane (step 204), the method generates a set of stadia at a specified radii from the respective fracture line segment (step 206). The method then generates closed loops around all of the line segments of a fracture (step 208). In certain embodiments, the process of generating the closed loop around line segments of the fracture may include computing an intersection of all stadia sides for each specified radius for each line segment of the fracture (step 208A) and discarding the contained segments for each straight line segment in each fracture line segment that are wholly contained by stadia of other line segments in the fracture line segment (step 208B).

Following step 208, the method generates shape elements within the closed loops of the straight line segment (step 210). For example, in one embodiment, the process generates parametrical segments along a length and radius of each straight line segment (step 210A). The process then forms quadrilateral elements where possible within the structured region (step 210B) and form polygons within the remaining regions of the closed loops (step 210C).

Once the shape elements are generated, the process generates a constrained mesh around the closed loops of the set of fracture line segments, filling the remainder of the two-dimensional plane (step 212). In one embodiment, a Delaunay triangulation algorithm is utilized to generate the constrained mesh around the closed loops of the set of fracture line segments. Thus, the two-dimensional plane now consists entirely of cell elements of the fracture line segments and the constrained mesh. From here, the process can extrude each of the cells in the two-dimensional plane to a third dimension for creating one or more layers of three-dimensional cells.

The cells within a closed loop of a fracture line segment represent a three-dimensional fracture, whereas the cells within the mesh represent the rock layers encompassing the fractures. Thus, the process can assign reservoir properties such as, but not limited to, porosity and permeability, to each of the three-dimensional cells for modeling the fluid flow of the reservoir (step 216). Finally, the process can input the three-dimensional cellular model into a simulation program, such as, but not limited to, Nexus® reservoir simulation software, for performing numerical simulation and for assessing the fluid flow (step 218).

Figure 3:
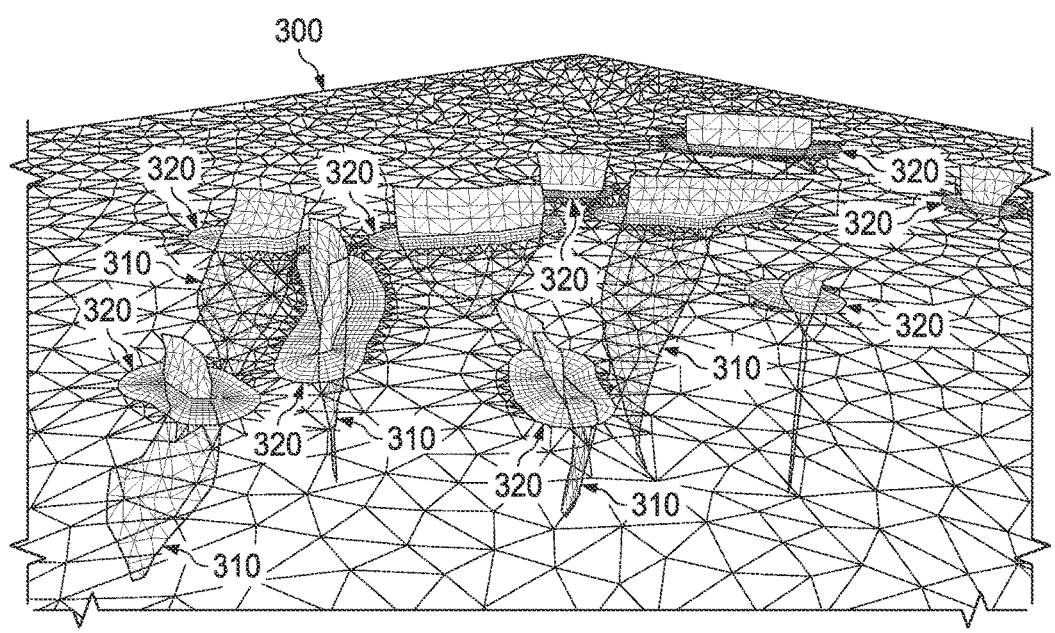
FIG. 3 illustrates an example of a set of discretized three-dimensional fractures intersecting a two dimensional plane in accordance with the disclosed embodiments.

For illustrative purposes only, FIG. 3 illustrates a broad perspective of an example of a set of three-dimensional fractures 310 that intersect, at line segments 320, a two-dimensional plane 300 in accordance with the disclosed embodiments. As can be seen from the diagram, a set of closed loop stadia are generated around each of the line segments 320 and a constrained mesh fills the remaining space of the two-dimensional plane 300 as described above the process 200.

Figure 4:
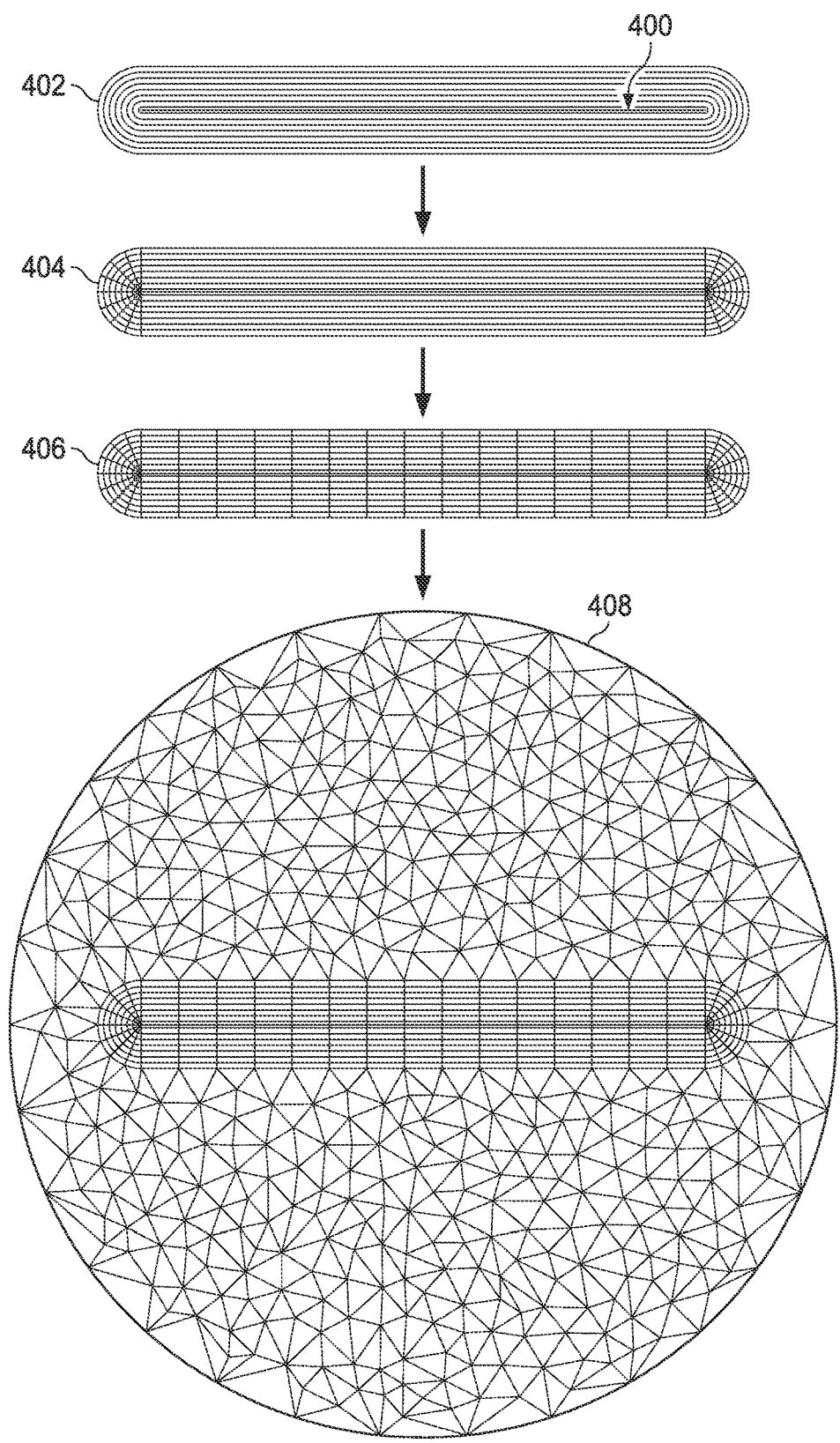
FIG. 4 illustrates an example for generating a computational mesh around a fracture line segment in accordance with the disclosed embodiments.

FIG. 4 provides a closer view of the process 200 by illustrating an example for generating a computational mesh around a single fracture line segment in accordance with the disclosed embodiments. Beginning with diagram 402, a set of stadia is generated around a line segment 400. As can be seen by diagram 402, each stadium in the set of stadia consists of two linear sides connected by two arcs to completely enclose the straight line segment. The distance from each side to the straight line segment is a constant radius. In certain embodiments, the radius distance may be user modifiable variable value.

In diagram 404, parametrical segments along a length and radius of each straight line segment is generated in accordance with step 210A of the process 200. Quadrilateral elements are then form where possible within the structured region as referenced in step 210B of the process 200. Diagram 408 illustrates the constrained mesh generated around the closed loops of the line segment 400.

Figure 5:
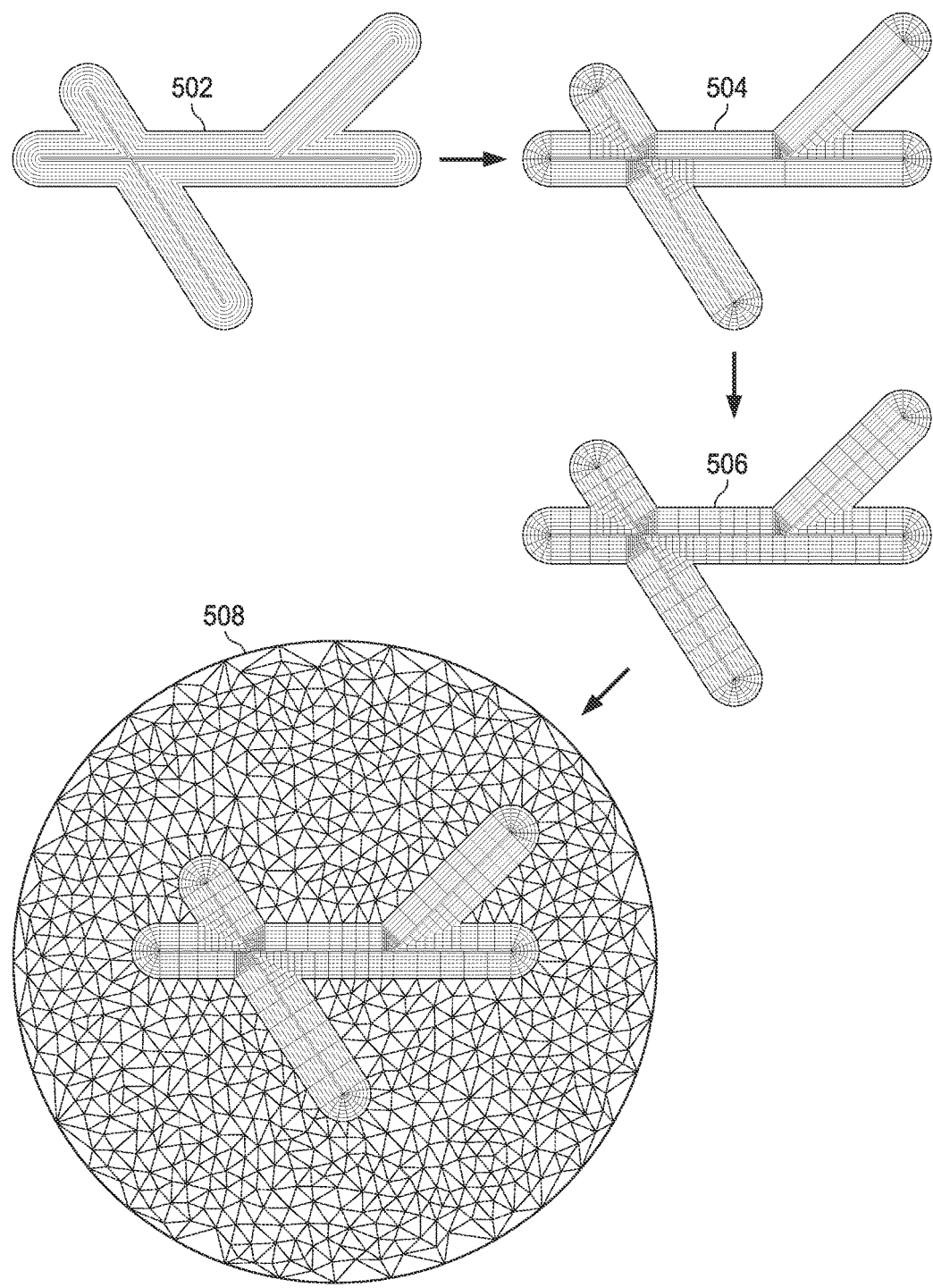
FIG. 5 illustrates an example of generating computational meshes around intersecting fracture line segments in accordance with the disclosed embodiments.

FIG. 5 provides another close-up view of the process 200 by illustrating an example of generating computational meshes around intersecting fracture line segments in accordance with the disclosed embodiments. For instance, diagram 502 illustrates a set of stadia generated around three intersecting fracture line segments. The result of diagram 502 required that the process compute an intersection of all stadia sides for each specified radius for each of the intersecting fracture line segment as referenced in step 208A and discard the contained segments for each fracture line segment that are wholly contained by stadia of other fracture line segments as referenced in step 208B.

Diagram 504 illustrates the results of generating shape elements within the closed loops of the fracture line segments as referenced in step 210. As can be seen, parametrical segments along a length and radius of each fracture line segment is generated in accordance with step 210A. Quadrilateral elements are then form where possible within the structured region as referenced in step 210B as illustrated in diagram 506. In addition, polygons are formed within the remaining regions of the closed loops of the fracture line segments as stated in step 210C. Diagram 508 illustrates a constrained mesh generated around the closed loops of the intersecting fracture line segments as referenced in step 212 of process 200.

Figure 6:
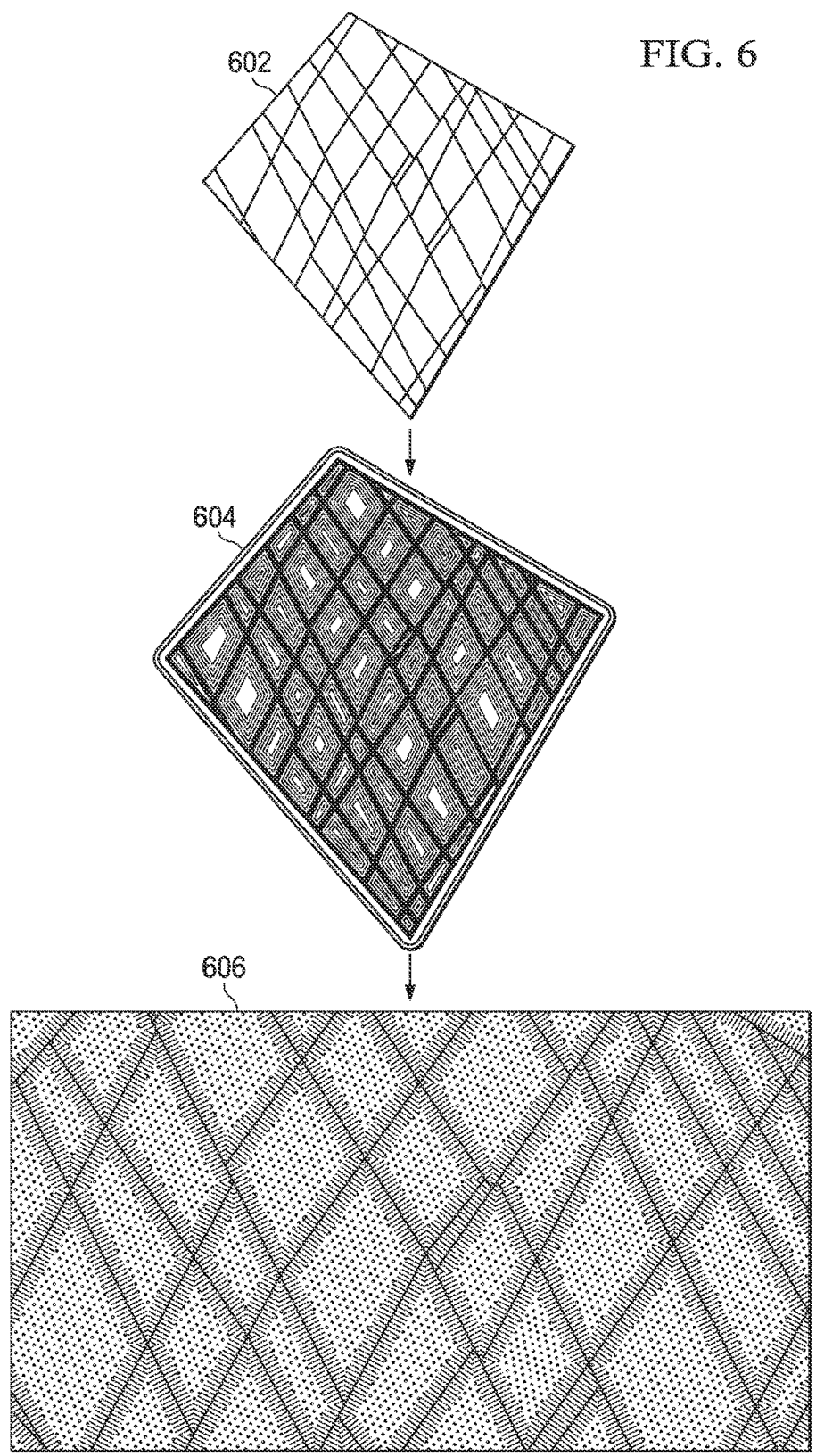
FIG. 6 illustrates an example of computational meshes around a complex array of fracture line segments in accordance with the disclosed embodiments.

FIG. 6 illustrates an example of computational meshes being generated around a complex array of fracture line segments in accordance with the disclosed embodiments. Diagram 602 indicates a set of fractures with geometry that has been discretized in a two-dimensional plane by a collection of line segments. Diagram 604 illustrates the results of a set of stadia being generated around each of the fracture line segments. Diagram 606 illustrates an exploded view of the fracture line segments as a result of performing the remaining process described in FIG. 2.

As can be seen from FIG. 6, the disclosed algorithm can quickly generate unstructured grids using structured elements around complex geometries. As previously stated, the cells in the two-dimensional plane shown in FIG. 6 may then be extruded in a third dimension to form layers of three-dimensional cells. The three-dimensional cells may then be assigned reservoir properties for enabling numeric simulation.

Figure 7:
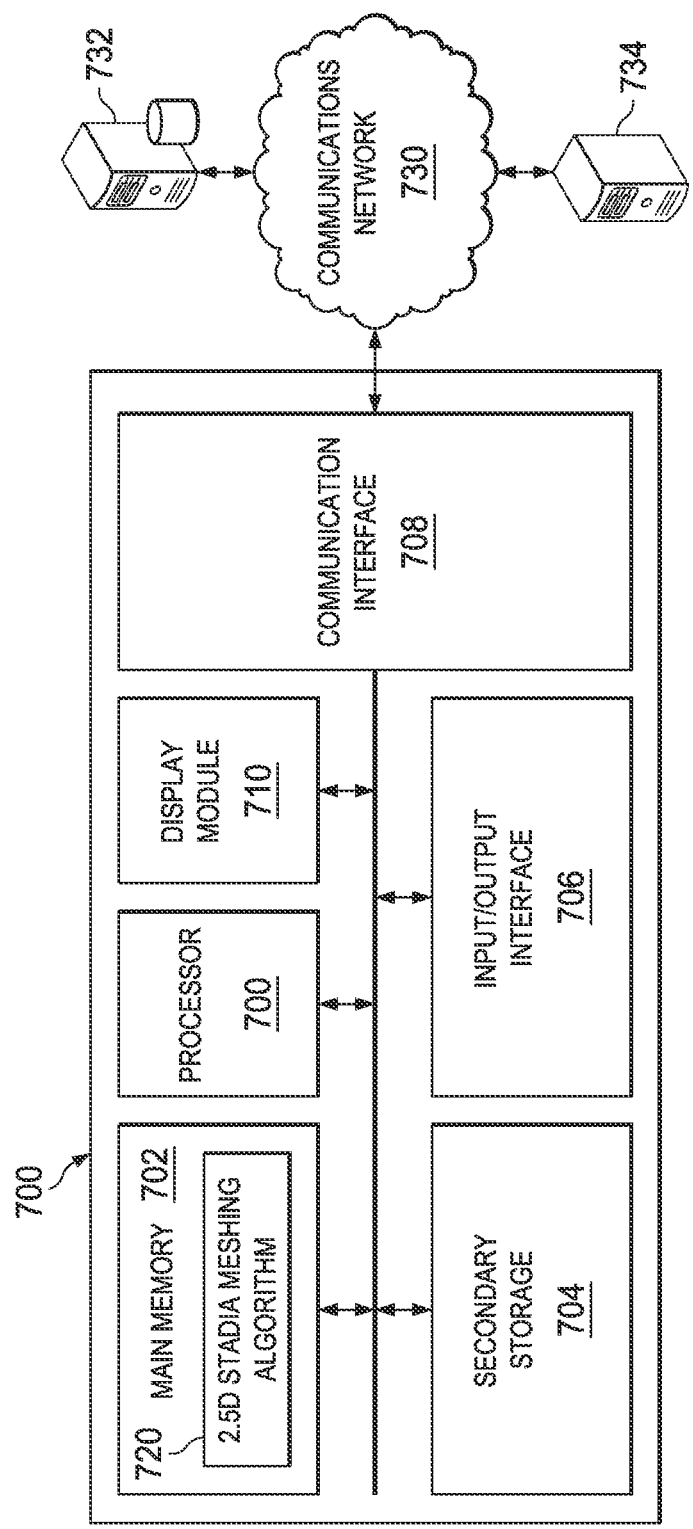
FIG. 7 is a block diagram illustrating one embodiment of a system for implementing the disclosed embodiments.

FIG. 7 is a block diagram illustrating one embodiment of a system 700 for implementing the features and functions of the disclosed embodiments. The system 700 includes, among other components, a processor 700, main memory 702, secondary storage unit 704, an input/output interface module 706, and a communication interface module 708. The processor 700 may be any type or any number of single core or multi-core processors capable of executing instructions for performing the features and functions of the disclosed embodiments.

The input/output interface module 706 enables the system 700 to receive user input (e.g., from a keyboard and mouse) and output information to one or more devices such as, but not limited to, printers, external data storage devices, and audio speakers. The system 700 may optionally include a separate display module 710 to enable information to be displayed on an integrated or external display device. For instance, the display module 710 may include instructions or hardware (e.g., a graphics card or chip) for providing enhanced graphics, touchscreen, and/or multi-touch functionalities associated with one or more display devices.

Main memory 702 is volatile memory that stores currently executing instructions/data, or instructions/data that are prefetched for execution. The secondary storage unit 704 is non-volatile memory for storing persistent data. The secondary storage unit 704 may be or include any type of data storage component such as a hard drive, a flash drive, or a memory card. In one embodiment, the secondary storage unit 704 stores the computer executable code/instructions and other relevant data for enabling a user to perform the features and functions of the disclosed embodiments.

For example, in accordance with the disclosed embodiments, the secondary storage unit 704 may permanently store the executable code/instructions of the above-described stadia meshing algorithm 720 for modeling three-dimensional (3D) objects such as, but not limited to, geological fractures. The instructions associated with the stadia meshing algorithm 720 are then loaded from the secondary storage unit 704 to main memory 702 during execution by the processor 700 as illustrated in FIG. 7.

The communication interface module 708 enables the system 700 to communicate with the communications network 730. For example, the network interface module 708 may include a network interface card and/or a wireless transceiver for enabling the system 700 to send and receive data through the communications network 730 and/or directly with other devices.

The communications network 730 may be any type of network including a combination of one or more of the following networks: a wide area network, a local area network, one or more private networks, the Internet, a telephone network such as the public switched telephone network (PSTN), one or more cellular networks, and wireless data networks. The communications network 730 may include a plurality of network nodes (not depicted) such as routers, network access points/gateways, switches, DNS servers, proxy servers, and other network nodes for assisting in routing of data/communications between devices.

For example, in one embodiment, the system 700 may interact with one or more servers 734 or databases 732 for performing the features of the present invention. For instance, the system 700 may query the database 732 for geological information for assigning reservoir properties to cells for performing a simulation. The system 700 may query the database 732 for well log information for determining fracture orientation or density for enabling modeling of the fractures in accordance with the disclosed embodiments. Further, in certain embodiments, the system 700 may act as a server system for one or more client devices or a peer system for peer to peer communications or parallel processing with one or more devices.

Figure 8:
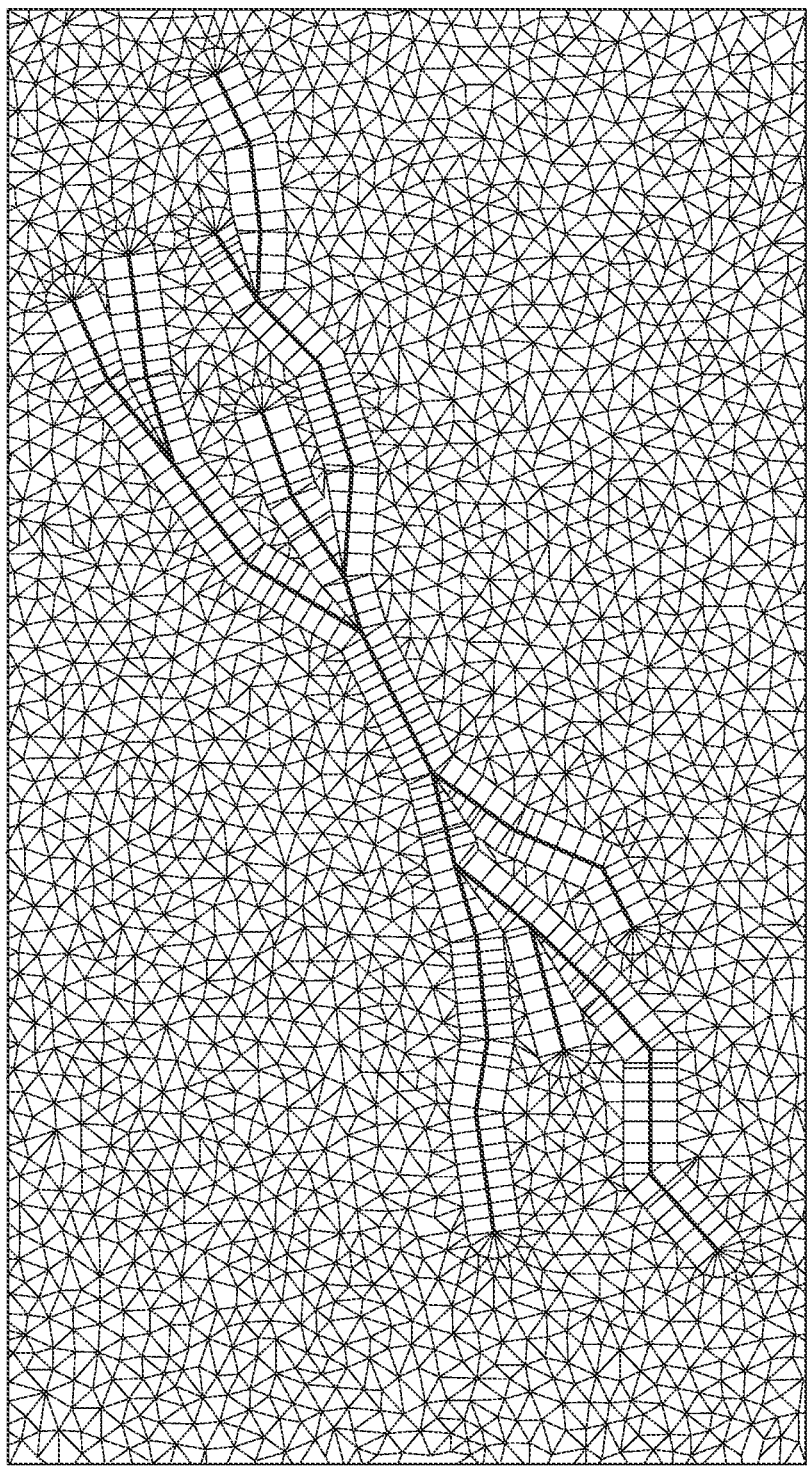
FIG. 8 illustrates another example of an unstructured grid generated around complex geometries comprising of a plurality of intersecting fracture line segments in accordance with the disclosed embodiments.

Accordingly, as described above, advantages of the disclosed embodiments include, but are not limited to, providing fast generation of unstructured grids with structured elements around complex geometries. In addition, low expertise is required on the part of the user to be able to utilize the disclosed embodiments to generate high quality grid cells that are suitable for many numeric simulators. For instance, the disclosed embodiments enable workflows for non-experts to use advanced numeric modeling techniques for complicated geometries that would have previously required users to make gross approximations and/or require per-use assistance from numeric modeling experts. As another example, FIG. 8 illustrates another example of complex geometries involving a plurality of intersecting fracture line segments in which the disclosed embodiments may quickly generate a two-dimensional grid cell that may be extruded into three-dimensional elements for performing numeric simulations in accordance with the disclosed embodiments.

While specific details about the above embodiments have been described, the above hardware and software descriptions are intended merely as example embodiments and are not intended to limit the structure or implementation of the disclosed embodiments. For instance, although many other internal components of the system 700 are not shown, those of ordinary skill in the art will appreciate that such components and their interconnection are well known.

In addition, certain aspects of the disclosed embodiments, as outlined above, may be embodied in software that is executed using one or more processing units/components. Program aspects of the technology may be thought of as "products" or "articles of manufacture" typically in the form of executable code and/or associated data that is carried on or embodied in a type of machine readable medium. Tangible non-transitory "storage" type media include any or all of the memory or other storage for the computers, processors or the like, or associated modules thereof, such as various semiconductor memories, tape drives, disk drives, optical or magnetic disks, and the like, which may provide storage at any time for the software programming.

Those skilled in the art will recognize that the present teachings are amenable to a variety of modifications and/or enhancements. While the foregoing has described what is considered to be the best mode and/or other examples, it is understood that various modifications may be made therein and that the subject matter disclosed herein may be implemented in various forms and examples, and that the teachings may be applied in numerous applications, only some of which have been described herein. Such modifications are intended to be covered within the true scope of the present teachings.

In addition, the flowchart and block diagrams in the figures illustrate the architecture, functionality, and operation of possible implementations of systems, methods and computer program products according to various embodiments of the present invention. It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The disclosed embodiments include a method, apparatus, and computer program product for generating hybrid computational meshes around complex and discrete fractures for the purpose of reservoir simulation. For example, one embodiment is a computer-implemented method for modeling three-dimensional (3D) geological fractures. The method includes the steps of receiving a set of fractures with geometry that has been discretized in a two-dimensional plane by a collection of line segments. The method generates closed loops around all the line segments associated with a fracture using a set of stadia and further generates shape elements within the closed loops. For example, in one embodiment, the method computes an intersection of all stadia sides at each specified radius of the line segments to identify and discard contained segments for each line segment that are wholly contained by stadia of other line segments that are associated with the fracture. The shape elements may be generated by generating parametrical segments along a length and radius of the line segment within the closed loops of the line segment, forming quadrilateral elements where possible within the closed loops of the line segment, and forming polygons in remaining regions within the closed loops of the line segment. A constrained mesh around the closed loops of the set of fracture is generated to fill in a remainder space of the two-dimensional plane. The cell elements in the two-dimensional plane can then be extruded in a third dimension to form a three-dimensional model usable for performing reservoir simulations.

The computer-implemented method may further include substituting a fracture line segment with one or more straight line segments to approximate a curvature of the fracture line segment. In another embodiment, generating the closed loops around all the line segments associated with the fracture comprises for each line segment comprises computing an intersection of all stadia sides for each specified radius, identifying contained segments for each line segment that are wholly contained by stadia of other line segments that are associated with the fracture, and discarding the contained segments for each line segment resulting in closed loops around line segments associated with the fracture. Generating shape elements within the closed loops of the line segment may further comprise generating parametrical segments along a length and radius of the line segment within the closed loops of the line segment, forming quadrilateral elements where possible within the closed loops of the line segment, and forming polygons in remaining regions within the closed loops of the line segment. Generating the constrained mesh around the closed loops of the set of fracture line segments to fill in the remainder space of the two-dimensional plane may be implemented using a Delaunay triangulation algorithm. In another embodiment, each stadium in the set of stadia consists of two linear sides connected by two arcs to completely enclose the line segment. A distance from each side to the line segment may be a constant radius. The computer-implemented method may further comprise assigning reservoir properties to three-dimensional cells in the three-dimensional model, or inputting the three-dimensional model into a numeric simulation program. In another embodiment, the numeric simulation program of the computer-implemented method may be Nexus® Reservoir Simulation Software.

In still another embodiment, a non-transitory computer readable medium comprising computer executable instructions for modeling a three-dimensional (3D) structure is provided. The computer executable instructions when executed causes one or more machines to perform operations comprising receiving a set of fractures with geometry that has been discretized in a two-dimensional plane by a collection of line segments. The computer executable instructions further comprise, for each line segment associated with each fracture of the set of fractures, generating a set of stadia at a specified radii from a line segment, generating closed loops around all the line segments associated with a fracture, and generating shape elements within the closed loops of the line segment. A constrained mesh is generated around the closed loops of the set of fracture to fill in a remainder space of the two-dimensional plane, and elements in the two-dimensional plane are extruded in a third dimension to form a three-dimensional model containing layers of three-dimensional cells of the set of fractures and the constrained mesh.

In another embodiment, computer readable medium comprises computer executable instructions that when executed causes the one or more machines to substitute a fracture line segment using one or more straight line segments to approximate a curvature of the fracture line segment. In yet another embodiment, the computer executable instructions for generating the closed loops around all the line segments associated with the fracture, for each line segment, includes computing an intersection of all stadia sides for each specified radius, identifying contained segments for each line segment that are wholly contained by stadia of other line segments that are associated with the fracture, and discarding the contained segments for each line segment resulting in closed loops around line segments associated with the fracture. The computer executable instructions for generating shape elements within the closed loops of the line segment may further include generating parametrical segments along a length and radius of the line segment within the closed loops of the line segment, forming quadrilateral elements where possible within the closed loops of the line segment, and forming polygons in remaining regions within the closed loops of the line segment. In another embodiment, the computer executable instructions for generating the constrained mesh around the closed loops of the set of fracture line segments to fill in the remainder space of the two-dimensional plane may be implemented using a Delaunay triangulation algorithm. In yet another embodiment, the computer readable medium may further comprise computer executable instructions that when executed cause the one or more machines to assign reservoir properties to three-dimensional cells in the three-dimensional model.

In still another embodiment, a system includes at least one processor and at least one memory coupled to the at least one processor and storing instructions that when executed by the at least one processor performs operations comprising, given a set of fractures with geometry that has been discretized in a two-dimensional plane by a collection of line segments, for each line segment associated with each fracture of the set of fractures, generating a set of stadia at a specified radii from a line segment. Closed loops are generated around all the line segments associated with a fracture. Shape elements are generated within the closed loops of the line segment, and a constrained mesh is generated around the closed loops of the set of fracture to fill in a remainder space of the two-dimensional plane. The operations further comprise extruding elements in the two-dimensional plane in a third dimension to form a three-dimensional model containing layers of three-dimensional cells of the set of fractures and the constrained mesh.

In another embodiment, the system may further include instructions for previously discretizing the set of fractures in the two-dimensional plane by the collection of line segments. The instructions for generating the closed loops around all the line segments associated with the fracture comprises instructions that may further comprise, for each line segment associated with the fracture, computing an intersection of all stadia sides for each specified radius, identifying contained segments for each line segment that are wholly contained by stadia of other line segments that are associated with the fracture, and discarding the contained segments for each line segment resulting in closed loops around line segments associated with the fracture. In another embodiment, the instructions for generating shape elements within the closed loops of the line segment comprises instructions that may comprise generating parametrical segments along a length and radius of the line segment within the closed loops of the line segment, forming quadrilateral elements where possible within the closed loops of the line segment, and forming polygons in remaining regions within the closed loops of the line segment. The system may further comprise instructions for assigning reservoir properties to three-dimensional cells in the three-dimensional model.

The terminology used herein is for describing particular embodiments only and is not intended to be limiting of the invention. As used herein, the singular forms "a", "an" and "the" are intended to include the plural forms as well, unless the context clearly indicates otherwise. It will be further understood that the terms "comprise" and/or "comprising," when used in this specification and/or the claims, specify the presence of stated features, integers, steps, operations, elements, and/or components, but do not preclude the presence or addition of one or more other features, integers, steps, operations, elements, components, and/or groups thereof. The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described to explain the principles of the invention and the practical application, and to enable others of ordinary skill in the art to understand the invention for various embodiments with various modifications as are suited to the particular use contemplated. The scope of the claims is intended to broadly cover the disclosed embodiments and any such modification.

The invention claimed is:

1. A computer-implemented method for modeling three-dimensional (3D) geological fractures, the method comprising:
   receiving, by a processor, a collection of line segments representing a set of three-dimensional fractures with geometry that has been discretized in a two-dimensional plane;
   for each line segment associated with each fracture of the set of three-dimensional fractures, generating, by the processor, a structured region in the two-dimensional plane by:
      generating a set of stadia at specified radii from the line segment to form closed loops around the line segment, wherein one or more straight line segments of the line segment that are wholly contained by stadia of other line segments associated with the fracture are discarded; and
      generating shape elements within the closed loops of the set of stadia generated for the line segment;
   generating a constrained mesh around the structured region associated with each fracture of the set of three-dimensional fractures so as to fill in a remainder space of the two-dimensional plane with additional shape elements representing one or more layers of a reservoir formation encompassing the set of three-dimensional fractures;
   extruding the shape elements from the structured region and the constrained mesh for each fracture in the two-dimensional plane into a third dimension so as to form a three-dimensional model with layers of three-dimensional cells representing the set of three-dimensional fractures and the one or more layers of the formation; and
   simulating fluid flow within the reservoir formation, based on the three-dimensional model, wherein the simulated fluid flow is used to estimate petroleum reserves and perform production operations within the reservoir formation.

2. The computer-implemented method of claim 1, further comprising substituting each line segment for at least one fracture in the three-dimensional fractures with one or more straight line segments to approximate a curvature of the at least one fracture.

3. The computer-implemented method of claim 1, wherein generating the set of stadia of the structured region for each line segment further comprises:
   computing an intersection of all stadia sides for each specified radius;
   identifying the one or more straight line segments of the line segment that are wholly contained by the stadia of the other line segments that are associated with the fracture, based on the computed intersection; and
   discarding the one or more identified straight line segments to form the closed loops around the line segment.

4. The computer-implemented method of claim 1, wherein generating shape elements within the closed loops comprises:
   generating parametrical segments along a length and radius of the closed loops;
   forming quadrilateral elements within the closed loops; and
   forming polygons in remaining regions within the closed loops.

5. The computer-implemented method of claim 1, wherein the constrained mesh is generated using a Delaunay triangulation algorithm.

6. The computer-implemented method of claim 1, wherein each stadium in the set of stadia consists of two linear sides connected by two arcs to completely enclose the line segment, and wherein a distance from each side to the line segment is a constant radius.

7. The computer-implemented method of claim 1, further comprising assigning reservoir properties to three-dimensional cells in the three-dimensional model.

8. The computer-implemented method of claim 7, wherein the reservoir simulator is a numeric simulation program executable by the processor, and providing the three-dimensional model to the reservoir simulator comprises inputting the three-dimensional model into the numeric simulation program.

9. The computer-implemented method of claim 8, wherein the numeric simulation program is a reservoir simulation program for simulating fluid flow within the reservoir formation.

10. A non-transitory computer readable medium comprising computer executable instructions for modeling a three-dimensional (3D) structure, the computer executable instructions when executed causes one or more machines to perform operations comprising:
   receiving a collection of line segments representing a set of three-dimensional fractures with geometry that has been discretized in a two-dimensional plane;
   for each line segment associated with each fracture of the set of three-dimensional fractures, generating a structured region in the two-dimensional plane by:
      generating a set of stadia at specified radii from the line segment to form closed loops around the line segment, wherein one or more straight line segments of the line segment that are wholly contained by stadia of other line segments associated with the fracture are discarded; and
      generating shape elements within the closed loops of the set of stadia generated for the line segment;
   generating a constrained mesh around the structured region associated with each fracture of the set of three-dimensional fractures so as to fill in a remainder space of the two-dimensional plane with additional shape elements representing one or more layers of a reservoir formation encompassing the set of three-dimensional fractures;

extruding the shape elements from the structured region and the constrained mesh for each fracture in the two-dimensional plane into a third dimension so as to form a three-dimensional model with layers of three-dimensional cells representing the set of three-dimensional fractures and the one or more layers of the formation; and simulating fluid flow within the reservoir formation, based on the three-dimensional model, wherein the simulated fluid flow is used to estimate petroleum reserves and perform production operations within the reservoir formation.

11. The computer readable medium of claim 10, further comprising computer executable instructions that when executed causes the one or more machines to substitute each line segment for at least one fracture in the three-dimensional fractures with one or more straight line segments to approximate a curvature of the at least one fracture.

12. The computer readable medium of claim 10, wherein the computer executable instructions further comprise instructions for:
   computing an intersection of all stadia sides for each specified radius;
   identifying the one or more straight line segments of the line segment that are wholly contained by the stadia of the other line segments that are associated with the fracture, based on the computed intersection; and
   discarding the one or more identified straight line segments to form the closed loops around the line segment.

13. The computer readable medium of claim 10, wherein the computer executable instructions for generating shape elements within the closed loops of the set of stadia generated for the line segment further comprise instructions for:
   generating parametrical segments along a length and radius of the closed loops;
   forming quadrilateral elements within the closed loops; and
   forming polygons in remaining regions within the closed loops.

14. The computer readable medium of claim 10, wherein the constrained mesh is generated using a Delaunay triangulation algorithm.

15. The computer readable medium of claim 10, further comprising computer executable instructions that when executed causes the one or more machines to assign reservoir properties to three-dimensional cells in the three-dimensional model.

16. A system, comprising:
   at least one processor; and
   at least one memory coupled to the at least one processor and storing instructions that when executed by the at least one processor causes the at least one processor to perform operations comprising:
   receiving a collection of line segments representing a set of three-dimensional fractures with geometry that has been discretized in a two-dimensional plane;
   for each line segment associated with each fracture of the set of three-dimensional fractures, generating a structured region in the two-dimensional plane by:
      generating a set of stadia at specified radii from the line segment to form closed loops around the line segment, wherein one or more straight line segments of the line segment that are wholly contained by stadia of other line segments associated with the fracture are discarded; and
      generating shape elements within the closed loops of the set of stadia generated for the line segment;
   generating a constrained mesh around the structured region associated with each fracture of the set of three-dimensional fractures so as to fill in a remainder space of the two-dimensional plane with additional shape elements representing one or more layers of a reservoir formation encompassing the set of three-dimensional fractures;
   extruding the shape elements from the structured region and the constrained mesh in the two-dimensional plane into a third dimension so as to form a three-dimensional model with layers of three-dimensional cells representing the set of three-dimensional fractures and the one or more layers of the formation; and
   simulating fluid flow within the reservoir formation, based on the three-dimensional model, wherein the simulated fluid flow is used to estimate petroleum reserves and perform production operations within the reservoir formation.

17. The system of claim 16, further comprising instructions for previously discretizing the set of fractures in the two-dimensional plane by the collection of line segments.

18. The system of claim 16, wherein the instructions further comprise instructions for:
   computing an intersection of all stadia sides for each specified radius;
   identifying the one or more straight line segments of the line segment that are wholly contained by the stadia of the other line segments that are associated with the fracture, based on the computed intersection; and
   discarding the one or more identified straight line segments to form the closed loops around the line segment.

19. The system of claim 16, wherein the instructions for generating shape elements within the closed loops of the set of stadia generated for the line segment further comprise instructions for:
   generating parametrical segments along a length and radius of the closed loops;
   forming quadrilateral elements within the closed loops; and
   forming polygons in remaining regions within the closed loops.

20. The system of claim 16, further comprising instructions for assigning reservoir properties to three-dimensional cells in the three-dimensional model.

\* \* \* \* \*